US011757095B2

(12) United States Patent
Zhang et al.

(10) Patent No.: US 11,757,095 B2
(45) Date of Patent: Sep. 12, 2023

(54) METHOD AND APPARATUS FOR PREPARING TRANSITION METAL LITHIUM OXIDE

(71) Applicant: SHANDONG ZSTONE NEW MATERIAL TECHNOLOGY CO., LTD., Shandong (CN)

(72) Inventors: Huibin Zhang, Shandong (CN); Ying Wang, Shandong (CN); Jinfu Wang, Shandong (CN); Hongdong Zhao, Shandong (CN); Longwei Niu, Shandong (CN)

(73) Assignee: SHANDONG ZSTONE NEW MATERIAL TECHNOLOGY CO., LTD., Shandong (CN)

( * ) Notice: Subject to any disclaimer, the term of this patent is extended or adjusted under 35 U.S.C. 154(b) by 803 days.

(21) Appl. No.: 16/609,742

(22) PCT Filed: May 31, 2019

(86) PCT No.: PCT/CN2019/089422
§ 371 (c)(1),
(2) Date: Oct. 31, 2019

(87) PCT Pub. No.: WO2020/224020
PCT Pub. Date: Nov. 12, 2020

(65) Prior Publication Data
US 2021/0336261 A1    Oct. 28, 2021

(30) Foreign Application Priority Data

May 6, 2019   (CN) .......................... 201910371372.8
May 6, 2019   (CN) .......................... 201920637155.4
May 23, 2019  (CN) .......................... 201910433634.9

(51) Int. Cl.
   *H01B 1/08* (2006.01)
   *H01M 4/525* (2010.01)
   (Continued)

(52) U.S. Cl.
   CPC ........... *H01M 4/525* (2013.01); *B01J 8/0055* (2013.01); *B01J 8/087* (2013.01); *B01J 8/12* (2013.01);
   (Continued)

(58) Field of Classification Search
   CPC ........... H01B 1/00; H01B 1/08; H01M 4/525; H01M 4/0471; H01M 4/505; C01G 53/42; C01G 53/50
   See application file for complete search history.

(56) References Cited

U.S. PATENT DOCUMENTS 6,875,416 B1 *   4/2005   Benz ..................... H01M 4/525
                                                       423/594.15
2008/0135802 A1 *  6/2008   Saito ..................... H01M 4/485
                                                       252/182.1
(Continued)

FOREIGN PATENT DOCUMENTS

CN    1247521 A    3/2000
CN    1284932 A    2/2001
(Continued)

OTHER PUBLICATIONS

Second Office Action dated Aug. 26, 2021 for Korean patent application No. 10-2019-7032363, English translation provided by Global Dossier.
(Continued)

*Primary Examiner* — Mark Kopec
(74) *Attorney, Agent, or Firm* — Yue (Robert) Xu

(57) ABSTRACT

The present disclosure provides a method for preparing a transition metal lithium oxide, comprising steps of:
(Continued)

mixing a lithium salt and a transition metal compound, and performing a pretreatment to obtain a precursor; wherein the pretreatment temperature is 100-300° C.; and the pretreatment time is 1-10 h; B) precalcining the precursor to obtain an intermediate; and C) continuously feeding the intermediate into a feed port of a moving bed reactor, and calcining, to obtain a transition metal lithium oxide. In the present disclosure, a pretreatment process is performed before the precalcination, and the pretreatment temperature and time are further limited, thereby solving the problem of material hardening during the calcination process of battery materials. In conjunction with using a moving bed reactor, the gas phase and the solid phase are sufficiently contacted, and at the same time the thickness of the filler is increased, the productivity is enhanced and the oxygen consumption is largely decreased at the same time. The present disclosure further provides an apparatus for preparing a transition metal lithium oxide.

8 Claims, 4 Drawing Sheets

(51) Int. Cl.
| | | |
|---|---|---|
| *B01J 8/00* | (2006.01) | |
| *B01J 8/08* | (2006.01) | |
| *B01J 8/12* | (2006.01) | |
| *C01G 53/00* | (2006.01) | |
| *H01M 4/505* | (2010.01) | |
| *H01M 4/04* | (2006.01) | |

(52) U.S. Cl.
CPC ............ *C01G 53/42* (2013.01); *C01G 53/50* (2013.01); *H01B 1/08* (2013.01); *H01M 4/0471* (2013.01); *H01M 4/505* (2013.01); *B01J 2208/00168* (2013.01); *B01J 2208/00176* (2013.01); *B01J 2208/00796* (2013.01); *C01P 2002/52* (2013.01); *C01P 2002/72* (2013.01); *C01P 2006/40* (2013.01)

(56) References Cited

U.S. PATENT DOCUMENTS

| | | | |
|---|---|---|---|
| 2011/0008227 A1* | 1/2011 | Sceats | B01J 6/004 |
| | | | 202/120 |
| 2011/0052484 A1* | 3/2011 | Krampitz | C01G 25/02 |
| | | | 423/594.15 |
| 2013/0108928 A1* | 5/2013 | Ito | C01G 23/005 |
| | | | 423/598 |
| 2014/0004473 A1 | 1/2014 | Song et al. | |
| 2014/0109386 A1 | 4/2014 | Matthews | |
| 2015/0115206 A1 | 4/2015 | Fujii et al. | |
| 2017/0253494 A1* | 9/2017 | Garella | B01J 19/02 |
| 2022/0135430 A1* | 5/2022 | Zhang | C01G 45/1221 |
| | | | 423/594.4 |

FOREIGN PATENT DOCUMENTS

| | | | |
|---|---|---|---|
| CN | 101771145 | A | 7/2010 |
| CN | 102522526 | B | 11/2013 |
| CN | 103430356 | A | 12/2013 |
| CN | 103943842 | A | 7/2014 |
| CN | 104852039 | A | 8/2015 |
| CN | 107001068 | A | 8/2017 |
| CN | 108172823 | A | 6/2018 |
| CN | 110015699 | A | 7/2019 |
| JP | 2004339028 | A | 12/2004 |
| JP | 2012136419 | A | 7/2012 |
| KR | 20000071180 | A | 11/2000 |
| KR | 20170088848 | A | 8/2017 |
| WO | 98/37023 | A1 | 8/1998 |
| WO | 9940029 | A1 | 8/1999 |
| WO | 2016/083185 | A1 | 6/2016 |

OTHER PUBLICATIONS

First Office Action dated Sep. 23, 2021 for Chinese patent application No. 201910433634.9, English translation provided by Global Dossier.

International Search Report and the Written Opinion of the International Search Authority for PCT application No. PCT/CN2019/089422.

First Office Action dated Feb. 3, 2021 for Korean patent application No. 10-2019-7032363, English translation provided by Global Dossier.

* cited by examiner

METHOD AND APPARATUS FOR PREPARING TRANSITION METAL LITHIUM OXIDE

CROSS REFERENCE TO RELATED APPLICATIONS

This application is the national phase of International Application No. PCT/CN2019/089422, titled "METHOD AND APPARATUS FOR PREPARING TRANSITION METAL LITHIUM OXIDE", filed on May 31, 2019, which claims the priority of Chinese Patent Application No. 201910371372.8, filed on May 6, 2019, and titled with "METHOD AND APPARATUS FOR PREPARING TRANSITION METAL LITHIUM OXIDE", Chinese Patent Application No. 201920637155.4, filed on May 6, 2019, and titled with "APPARATUS FOR PREPARING TRANSITION METAL LITHIUM OXIDE", Chinese Patent Application No. 201910433634.9, filed on May 23, 2019, and titled with "METHOD AND APPARATUS FOR PREPARING TRANSITION METAL LITHIUM OXIDE", and the disclosures of which are hereby incorporated by reference.

FIELD

The present disclosure relates to the field of lithium battery technology, specifically to a method and apparatus for preparing a transition metal lithium oxide.

BACKGROUND

In the traditional high-temperature solid-phase methods for producing battery materials, mixed solid raw materials are generally continuously heated in a ceramic crucible or saggar at a high temperature. In the production process, the atmosphere is insufficiently contacted with the solid reactant, the exhaust gas is discharged slowly, the scale of production is small, and the nonuniform contact of the raw material particles with the atmosphere affects product consistency. Therefore, it is necessary to improve the production process, to increase the production efficiency and product batch consistency.

In CN 102522526 B, the battery material is sintered by a converter, which is driven by a motor, and the material is continuously stirred during the calcination process. This scheme solves the problem of insufficient contact between the atmosphere and the material. However, driving the entire furnace body to rotate by using the motor greatly increases the energy consumption. At the same time, the temperature in the process for preparing the battery material is relatively high, generally in the range of 600° C.-1000° C., and the bearing is driven at a high temperature and bears a large torque, which is a great test for the bearing of the driving motor. At the same time, this invention uses the high-temperature flue gas generated by the gas combustion to heat or thermally insulate the material. Firstly, the accuracy of controlling the temperature in this way is not high, and the impurities in the high-temperature flue gas may cause the material performance to deteriorate.

SUMMARY

An object of the present disclosure is to provide a method and apparatus for preparing transition metal lithium oxide. The method in the present disclosure effectively solves the problem of insufficient connection of the gas phase and the solid phase. The obtained transition metal lithium oxide has excellent electrochemical performances, and can be continuously mass produced.

The present disclosure provides a method for preparing a transition metal lithium oxide, comprising steps of A) mixing a lithium salt and a transition metal compound, and performing a pretreatment to obtain a precursor; wherein the pretreatment temperature is 100-300° C.; and the pretreatment time is 1-10h;

B) precalcining the precursor to obtain an intermediate; and

C) continuously feeding the intermediate into a feed port of a moving bed reactor, and calcining, to obtain a transition metal lithium oxide.

Preferably, the precalcination temperature is 300-700° C.; and the precalcination time is 1-10 h.

Preferably, the precursor has an angle of repose of ≤50°.

Preferably, the moving bed reactor is filled with gas, and the gas is one or more of oxygen, nitrogen or air; and the gas has a flow velocity of 0.01-10 cm/s.

Preferably, the intermediate moves downward from the feed port at a moving velocity of 0.01-30 m/h.

Preferably, the intermediate falls downward in the moving bed reactor in a direction at an angle of 0-45° with respect to perpendicular.

Preferably, the calcination temperature is 500-1000° C.; and the intermediate in the moving bed reactor has a retention time of 5-20 h.

Preferably, after the calcination of step C), the method further comprises the following steps:

recalcining the calcined product, to obtain a transition metal lithium oxide;

wherein the recalcination temperature is 500-1000° C.; and the recalcination time is 1-10 h.

The present disclosure provides an apparatus for preparing a transition metal lithium oxide, comprising a moving bed reactor;

wherein the moving bed reactor has a ceramic inner wall surface, a peripheral heating device is disposed outside the moving bed reactor, several radiation heating elements are disposed in the inner chamber, and a gas distributing member is disposed at the bottom;

wherein the several radiation heating elements are uniformly distributed on the ceramic inner wall surface centering on the central axis;

a material buffer tank connected with a feed port of the moving bed reactor;

a gas-solid separator provided with an inlet, a top outlet and a bottom outlet, wherein the inlet of the gas-solid separator is connected with an upper portion of the moving bed reactor; and a heat exchanger, whose inlet is connected with the top outlet of the gas-solid separator.

Preferably, a ceramic liner is disposed in the material buffer tank.

The present disclosure provides a method for preparing a transition metal lithium oxide, comprising steps of: A) mixing a lithium salt and a transition metal compound, and performing a pretreatment to obtain a precursor; wherein the pretreatment temperature is 100-300° C.; and the pretreatment time is 1-10 h; B) precalcining the precursor to obtain an intermediate; and C) continuously feeding the intermediate into a feed port of a moving bed reactor, and calcining, to obtain a transition metal lithium oxide. In the present disclosure, a pretreatment process is performed before the precalcination, and the pretreatment temperature and time are further limited, thereby solving the problem of material hardening during the calcination process of battery materials. In conjunction with using a moving bed reactor, the gas phase and the solid phase are sufficiently contacted, and at the same time the thickness of the filler is increased, the productivity is enhanced and the oxygen consumption is largely decreased at the same time. Experiments show that a battery obtained by using the $LiNi_{0.8}Co_{0.1}Mn_{0.1}O_2$ material prepared in the examples of the present disclosure as the battery material has an initial discharge specific capacity of 201.2 mAh/g at 0.2C, a capacity retention rate of 98.5% after 100 cycles at 1C/1C, and the oxygen consumption of a unit mass material is as low as 1.6 kg/kg.

In addition, the apparatus of the present disclosure is provided with heating elements inside and outside the moving bed reactor, solving the problem of nonuniform heating of the moving bed reactor during the calcination process. Ceramic liners are designed at the positions in contact with the materials, to avoid the corrosion of the reaction apparatus by the material and the contamination of metal ions.

BRIEF DESCRIPTION OF DRAWINGS

In order to more clearly illustrate the embodiments of the present disclosure or the technical solutions in conventional art, the drawings used in the embodiments or the description in the conventional art will be briefly described hereinafter. It is obvious that the drawings in the following description are merely embodiments of the present disclosure, and one of ordinary skill in the art can obtain other drawings based on the provided drawings without any creative work.

DETAILED DESCRIPTION

Figure 1:
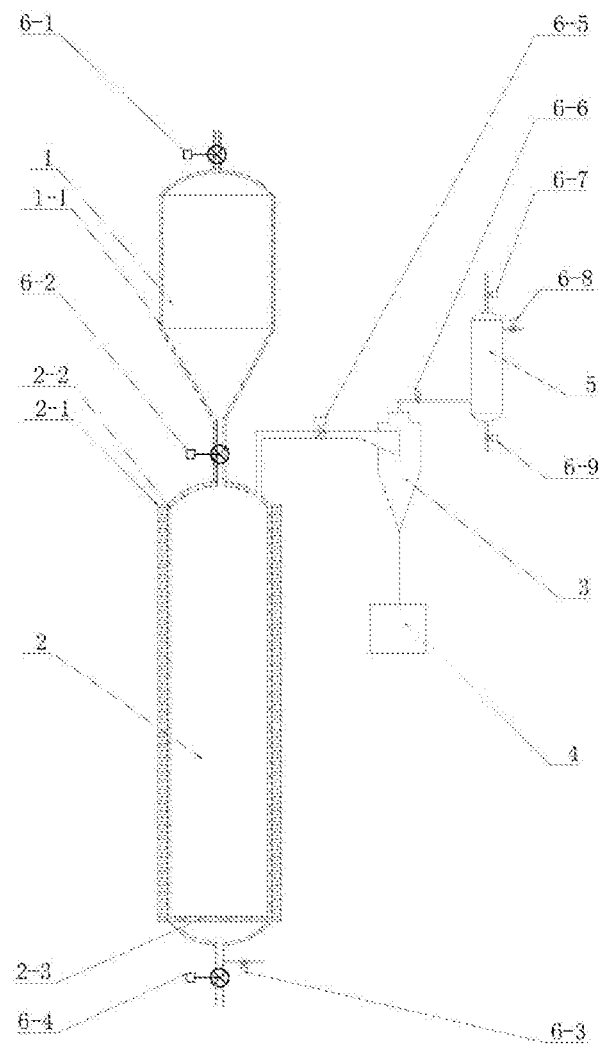
FIG. 1 shows a structural representation of the apparatus for preparing the transition metal lithium oxide in the present disclosure.

The present disclosure provides a method for preparing a transition metal lithium oxide, comprising steps of:

A) mixing a lithium salt and a transition metal compound, and performing a pretreatment to obtain a precursor; wherein the pretreatment temperature is 100-300° C.; and the pretreatment time is 1-10 h;

B) precalcining the precursor to obtain an intermediate; and

C) continuously feeding the intermediate into a feed port of a moving bed reactor, and calcining, to obtain a transition metal lithium oxide.

In the present disclosure, the lithium salt is preferably lithium hydroxide monohydrate, lithium oxide, lithium sulfate, lithium acetate, lithium nitrate, lithium carbonate, lithium hydroxide, lithium peroxide, lithium hydrogencarbonate and lithium halide, and the lithium halide is preferably lithium fluoride, lithium chloride or lithium bromide; and more preferably one or more selected from the group consisting of lithium carbonate, lithium hydroxide and lithium hydroxide monohydrate.

The transition metal compound is preferably transition metal oxide, transition metal oxyhydroxide, transition metal hydroxide and transition metal carbonate; the transition metal in the transition metal compound is preferably one or more selected from the group consisting of nickel, cobalt, manganese, titanium, vanadium and molybdenum. Specifically, in an embodiment of the present disclosure, the transition metal oxide may be $Ni_{0.8}Co_{0.1}Mn_{0.1}(OH)_2$, $Ni_{0.6}Co_{0.2}Mn_{0.2}(OH)_2$ or $Ni_{0.85}Co_{0.1}Al_{0.05}(OH)_2$. The specific surface arear of the transition metal compound is preferably ≤30 m²/g, more preferably ≤25 m²/g, and most preferably ≤20 m²/g.

In the present disclosure, the prepared transition metal lithium oxide is at least one selected from the group consisting of lithiated spinel, layered oxide, lithiated olivine or lithium nickel-cobalt-aluminum oxide. Examples of the transition metal lithium oxide in the present disclosure include $LiCoO_2$, $Li_2MnO_4$, $LiNiO_2$ and $Li_{1+a}Ni_xCo_yMn_{1-x-y}O_2$, $Li_{1+a}Ni_xCoyAl_{1-x-y}O_2$ compounds, etc., wherein a is 0-0.2, x is 0.33-0.93, and y is 0-0.33.

In the present disclosure, the pretreatment temperature is preferably 100-300° C., preferably 200-280° C., and more preferably 240-260° C. Specifically, in an embodiment of the present disclosure, the pretreatment temperature may be 240° C., 280° C. or 300° C.; the pretreatment time is preferably 1-10 h, more preferably 3-8 h, and most preferably 5-6 h.

In the present disclosure, the precursor obtained by pretreatment preferably has an angle of repose (angle of rest) of ≤50°, more preferably ≤45°, and most preferably 10-40°. Specifically, in an embodiment of the present disclosure, the angle of repose may be 35°.

After the pretreatment is completed, in the present disclosure, the obtained precursor is precalcined to obtain an intermediate. In the present disclosure, clean oxygen-containing gas is preferably continuously introduced during the precalcination process, and the content of oxygen in the oxygen-containing gas is preferably 20%-95%.

In the present disclosure, the precalcination temperature is preferably 300-700° C., more preferably 350-650° C., and most preferably 400-600° C. Specifically, in an embodiment of the present disclosure, the precalcination temperature may be 500° C. or 550° C. The precalcination time is preferably 1-10 h, more preferably 3-8 h, and most preferably 5-6 h.

The precalcination can be carried out in a fluidized bed reactor, a moving bed reactor, a fixed bed reactor or an agitated bed reactor, or carried out in a rotary kiln, a pendulum kiln, a roller hearth furnace or a tunnel kiln.

After obtaining the intermediate, in the present disclosure, the intermediate is continuously fed into a feed port of a moving bed reactor. After the intermediate is fed from the feed port to the moving bed reactor, it preferably moves obliquely from top to bottom. The oblique and the perpendicular are preferably at an angle of 0-45°. The moving bed reactor is filled with gas, and the flow direction of the gas may be from top to bottom, or from bottom to top, preferably opposite to the moving direction of the intermediate, forming a gas-solid countercurrent contact, thereby increasing the contact efficiency of the gas and solid phases and improving the reaction rate of the two phases.

The intermediate preferably moves downward from the feed port at a moving velocity of 0.01-30 m/h, more preferably 0.1-10 m/h, and most preferably 0.1-1 m/h. Specifically, in an embodiment of the present disclosure, the moving velocity is 0.1 m/h, 0.2 m/h, 0.3 m/h or 0.6 m/h. The gas is preferably an oxygen enrichment gas, preferably one or more oxygen enrichment gas selected from the group consisting of oxygen, nitrogen and air, such as a combination gas of oxygen and nitrogen, or air, oxygen, a combination gas of air and nitrogen, or combination gas of air and oxygen. The gas preferably has a flow velocity of 0.01-10 cm/s, more preferably 0.1-1 cm/s, and most preferably 0.1-0.5 cm/s. Specifically, in an embodiment of the present disclosure, the gas has a flow velocity of 0.1 cm/s, 0.4 cm/s or 0.5 cm/s.

In the present disclosure, the calcination temperature is preferably 500-1000° C., more preferably 600-900° C., and most preferably 700-800° C. Specifically, in an embodiment of the present disclosure, the calcination temperature is 780° C., 880° C. or 900° C. The intermediate in the moving bed reactor preferably has a retention time of 5-20 h, and more preferably 5-10 h. Specifically, in an embodiment of the present disclosure, the retention time is 5 h, 6 h or 10 h.

After the calcination in the moving bed reactor is completed, in the present disclosure, the obtained product is preferably recalcined to obtain a transition metal lithium oxide. In the present disclosure, the recalcination can be carried out in a fluidized bed reactor, a moving bed reactor, a rotary kiln, a pendulum kiln, a roller hearth furnace, a tunnel kiln or an agitated bed reactor. The recalcination temperature is preferably 500-1000° C., and more preferably 550-950° C. The recalcination time is preferably 1-10 h, more preferably 2-8 h, and most preferably 5-6 h.

In the present disclosure, the transition metal lithium oxide prepared by the above method has a mean particle size D50 of 1-20 μm and a specific surface area of 0.1-20 $m^2/g$. The transition metal lithium oxide is used to produce primary rechargeable battery or secondary rechargeable battery, and preferably used to produce secondary rechargeable battery.

The present disclosure provides an apparatus for preparing a transition metal lithium oxide, comprising
a moving bed reactor;
wherein the moving bed reactor has a ceramic inner wall surface, a peripheral heating device is disposed outside the moving bed reactor, several radiation heating elements are disposed in the inner chamber, and a gas distributing member is disposed at the bottom;
wherein the several radiation heating elements are uniformly distributed on the ceramic inner wall surface centering on the central axis;
a material buffer tank connected with a feed port of the moving bed reactor;
a gas-solid separator provided with an inlet, a top outlet and a bottom outlet, wherein the inlet of the gas-solid separator is connected with an upper portion of the moving bed reactor; and
a heat exchanger, whose inlet is connected with the top outlet of the gas-solid separator.

The apparatus has a structure as shown in FIG. 1, wherein 1 is a material buffer tank; 1-1 is a ceramic liner of the buffer tank; 2 is a moving bed; 2-1 is a peripheral kiln; 2-2 is a ceramic liner of the moving bed; 2-3 is a gas distributing member; 3 is a solid-gas separator; 4 is a material collecting tank; 5 is a heat exchanger; and 6-1 to 6-9 are valves.

Figure 5:
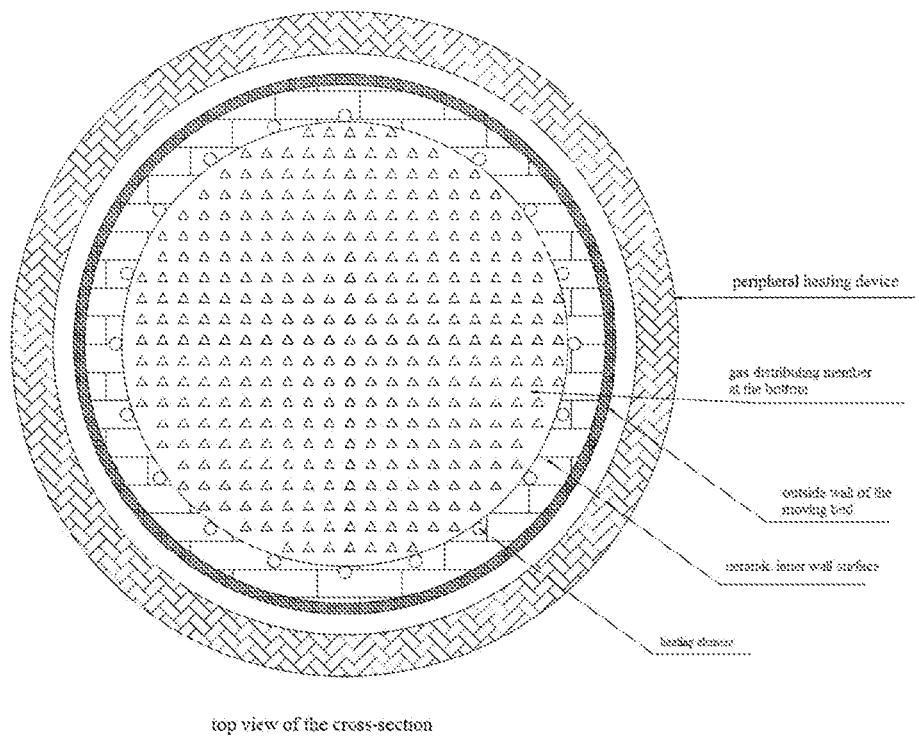
FIG. 5 shows a top view of the cross-section of the moving bed reactor in the present disclosure.

In the present disclosure, the moving bed reactor has an inner structure as shown in FIG. 5. A liner surface made of ceramic material is disposed inside the moving bed reactor, which is used for preventing the corrosion of reaction apparatus by lithium salts in the material, and preventing the contamination of product by metal ions at the same time. The thickness of the ceramic liner is preferably 0.1-20 cm, more preferably 1-15 cm, and most preferably 5-10 cm. The ceramic material is preferably one or more selected from the group consisting of oxide ceramics, nitride ceramics, carbide ceramics, ceramic composites, and more preferably oxide ceramics or ceramic composites.

Several radiation heating elements are disposed in the inner chamber of the moving bed reactor, and the several radiation heating elements are uniformly distributed on the ceramic inner wall surface centering on the central axis; a peripheral heating device is disposed outside the moving bed reactor, which is beneficial to more uniformly temperature distribution inside the moving bed reactor. The peripheral heating device is wrapped with a thermal insulation material. The peripheral heating device is not limited to electrical heating, and may be fuel gas heating or other heating means. The moving bed reactor in the present invention is divided into at least two temperature intervals, and the two temperature intervals are respectively 300-700° C. and 700-1000° C.; at least one temperature control element that can independently control the temperature is disposed in each temperature interval.

A gas distributing member is disposed at the bottom of the moving bed reactor, which is used to uniformly distribute the airflow introduced through the air-inflow pipe. In the present disclosure, there is no special limitation on the structure of the gas distributing member, and a gas distributing member commonly used by one of ordinary skill in the art can be used. A gas velocity control device is disposed on the air-inflow pipe, which is used to control the velocity and direction of airflow.

In the present disclosure, there is no special limitation on the size of the moving bed reactor. Specifically, in an embodiment of the present disclosure, a moving bed reactor having a diameter of 6 m and a height of 18 m is used, or a moving bed reactor having a diameter of 0.4 m and a height of 1 m.

In the present disclosure, the outlet of the material buffer tank is connected with a feed port of the moving bed reactor, which is used to introduce the reaction material into the moving bed reactor. The material buffer tank has an inner wall surface made of a corrosion-resistant material, which is used to withstand the corrosion of lithium salts, and present from reacting with the material to cause contamination. The corrosion-resistant material is preferably a ceramic material such as aluminium oxide, zirconium oxide, tungsten carbide, etc., a high polymer material such as Teflon, polyurethane, nylon, etc., or a corrosion-resistant metal alloy material.

The material buffer tank is preferably provided with a screw-type feeder, or the material feeding is realized by means of free fall under gravity, positive pressure transportation, negative pressure transportation, etc. The surface of the screw-type feeder in contact with the material has a surface made of corrosion-resistant material.

In the present disclosure, the gas-solid separator is provided with an inlet, a top outlet and a bottom outlet, wherein the inlet of the gas-solid separator is connected with an upper outlet of the moving bed reactor. In the present disclosure, the gas-solid separator is preferably a cyclone separator. The material of the cyclone separator is selected from the group consisting of high temperature-resistant, corrosion-resistant metal or metal alloy, or material having an inner wall surface made of ceramic material. The cyclone separator can separate the solid particles entrained in the airflow, and prevent contamination of the air in the workshop.

The bottom outlet of the gas-solid separator is connected with a material collecting tank, which is used to collect the solid material entrained in the airflow.

The top outlet of the gas-solid separator is connected with a heat exchanger, which is used to recycle the heat in the exhausted waste gas. The exhausted waste gas is heatexchanged in the heat exchanger to preheat the intake gas, to reduce the heat loss, thereby reducing the energy consumption.

Since the calcination of the transition metal lithium oxide in the present disclosure can be divided into different stages (such as precalcination, calcination and recalcination), the moving bed and other kinds of high temperature reactor or kiln can be connected in series by powder transferring pipelines, so as to achieve multiple calcination of the material. The pipelines have inner wall surfaces mad of ceramic material. The ceramic material can prevent the material from being contaminated to ensure an excellent performance of the material. In addition, the pipelines have a peripheral heating layer or an insulation layer, so as to ensure that the heat loss is minimized. The ceramic material is preferably oxide ceramics, nitride ceramics, carbide ceramics and ceramic composites, and more preferably oxide ceramics or ceramic composites. The ceramic composite is preferably oxide ceramic substrate, nitride ceramic substrate, boron carbide ceramic substrate or a combination thereof, and more preferably contains at least one oxide ceramic substrate.

The present disclosure provides a method for preparing a transition metal lithium oxide, comprising steps of: A) mixing a lithium salt and a transition metal compound, and performing a pretreatment to obtain a precursor; wherein the pretreatment temperature is 100-300° C.; and the pretreatment time is 1-10 h; B) precalcining the precursor to obtain an intermediate; and C) continuously feeding the intermediate into a feed port of a moving bed reactor, and calcining, to obtain a transition metal lithium oxide. In the present disclosure, a pretreatment process is performed before the precalcination, and the pretreatment temperature and time are further limited, thereby solving the problem of material hardening during the calcination process of battery materials. In conjunction with using a moving bed reactor, the gas phase and the solid phase are sufficiently contacted, and at the same time the thickness of the filler is increased, the productivity is enhanced and the oxygen consumption is largely decreased at the same time. Experiments show that a battery obtained by using the $LiNi_{0.8}Co_{0.1}Mn_{0.1}O_2$ material prepared in the examples of the present disclosure as the battery material has an initial discharge specific capacity of 201.2 mAh/g at 0.2C, a capacity retention rate of 98.5% after 100 cycles at 1C/1C, and the oxygen consumption of a unit mass material is as low as 1.6 kg/kg.

In addition, the apparatus of the present disclosure is provided with heating elements inside and outside the moving bed reactor, solving the problem of nonuniform heating of the moving bed reactor during the calcination process. Ceramic liners are designed at the positions in contact with the materials, to avoid the corrosion of the reaction apparatus by the material and the contamination of metal ions.

In order to further illustrate the present disclosure, a method and an apparatus for preparing a transition metal lithium oxide provided by the present disclosure will be described in detail in conjunction with examples hereinafter, but it should not be understood as the limitation of the scope of protection of the present disclosure.

EXAMPLE 1

100kg $Ni_{0.8}Co_{0.1}Mn_{0.1}(OH)_2$ having a mean particle size of 9 μm and a specific surface area of 8.2 m$^2$/g and 48.5 kg lithium hydroxide monohydrate were accurately weighted, uniformly mixed, and pretreated at 280° C. for 5 h. Then, the obtained precursor was precalcined in a tunnel kiln at 500° C., thermal insulated for 5 h. In the calcination process, clean oxygen enrichment gas having an oxygen content of 95% was continuously introduced, to obtain a transition metal lithium oxide intermediate.

The obtained transition metal lithium oxide intermediate was transferred to the feed port at the top of the moving bed reactor through a pipeline, and was then transferred into the moving bed reactor through the feed port at the top of the moving bed reactor. The intermediate moved from top to bottom at a velocity of 0.3 m/h, and stayed in the moving bed reactor for 6 h, and discharged from the bottom of the moving bed reactor, wherein the moving bed reactor had a diameter of 0.6 m and a height of 1.8 m. All of the pipelines, moving bed reactor and feed port had an inner wall surface made of ceramic coating layer which had a thickness of 0.04 m, thereby avoiding the introduction of impurities during the calcination process. The clean oxygen enrichment gas having an oxygen content of 95% was introduced from the bottom of the moving bed reactor from bottom to top at a velocity of 0.5 cm/s. Introduction of oxygen enrichment gas took away waste gases such as water vapor produced in the reaction process. The inner temperature of the moving bed reactor was set as 780° C., finally to give a $LiNi_{0.8}Co_{0.1}Mn_{0.1}O_2$ material.

EXAMPLE 2

150 kg $Ni_{0.6}Co_{0.2}Mn_{0.2}(OH)_2$ having a specific surface area of 6.2 m$^2$/g and 65.3 kg lithium carbonate were accurately weighted, uniformly mixed, and pretreated according to step b at 300° C. for 5 h. Then the obtained precursor was precalcined at 550° C. in a roller hearth furnace, and thermal insulated for 5 h. Clean air was continuously introduced during the precalcination process, to obtain an intermediate.

The obtained intermediate was transferred to the feed port at the top of the moving bed reactor through a pipeline, and was then transferred into the moving bed reactor through the feed port at the top of the moving bed reactor. The intermediate moved from top to bottom at a velocity of 0.1 m/h, stayed in the moving bed reactor for 10 h, and discharged from the bottom of the moving bed reactor, wherein the moving bed reactor had a diameter of 0.4 m and a height of 1 m. All of the pipelines, moving bed reactor and feed port had an inner wall surface made of ceramic coating layer which had a thickness of 0.05 m, thereby avoiding the introduction of impurities during the calcination process. Clean air was introduced from the bottom of the moving bed reactor from bottom to top at a velocity of 0.4 cm/s. Introduction of clean air took away waste gases such as water vapor and carbon dioxide produced in the reaction process. The inner temperature in the moving bed reactor was set as 900° C., finally to give a $LiNi_{0.6}Co_{0.2}Mn_{0.2}O_2$ material.

In the present example, by pretreating the mixture at 300° C. for 5 h, the problem of hardening in the subsequent calcination process was avoided.

EXAMPLE 3

150 kg $Ni_{0.6}Co_{0.2}Mn_{0.2}(OH)_2$ having a mean particle size of 9.3 μm, and a specific surface area of 12 m$^2$/g and 65.3 kg lithium carbonate were accurately weighted, uniformly mixed, and pretreated at 200° C. for 10 h. Then the obtained precursor was precalcined at 550° C. in a roller hearth furnace, and thermal insulated for 5 h. Clean air was continuously introduced during the calcination process, to obtain an intermediate.

The obtained intermediate was transferred to the feed port at the top of the moving bed reactor through a pipeline, and was then transferred into the moving bed reactor through the feed port at the top of the moving bed reactor. The intermediate moved from top to bottom at a velocity of 0.2 m/h, stayed in the moving bed reactor for 5 h, and discharged from the bottom of the moving bed reactor, wherein the moving bed reactor had a diameter of 0.4 m and a height of 1 m. All of the pipelines, moving bed reactor and feed port had an inner wall surface made of ceramic coating layer which had a thickness of 0.05 m, thereby avoiding the introduction of impurities during the calcination process. Clean air was introduced from the bottom of the moving bed reactor from bottom to top at a velocity of 0.1 cm/s. Introduction of clean air took away waste gases such as water vapor and carbon dioxide produced in the reaction process. The inner temperature in the moving bed reactor was set as 880° C., and the calcination time was 10 h, finally to give a $LiNi_{0.6}Co_{0.2}Mn_{0.2}O_2$ material.

EXAMPLE 4

100 kg $Ni_{0.85}Co_{0.1}Al_{0.5}(OH)_2$ having a mean particle size of 9.2 μm, and a specific surface area of 8.2 $m^2$/g and 48.5 kg lithium hydroxide monohydrate were accurately weighted, uniformly mixed, and pretreated at 240° C. for 5 h. Then the obtained precursor was precalcined at 550° C. in a tunnel kiln, and thermal insulated for 5 h. Clean oxygen enrichment gas having a oxygen content of 95% was continuously introduced during the calcination process, to obtain the transition metal lithium oxide intermediate.

The obtained transition metal lithium oxide intermediate was transferred to the feed port at the top of the moving bed reactor through a pipeline, and was then transferred into the moving bed reactor through the feed port at the top of the moving bed reactor. The intermediate moved from top to bottom at a velocity of 0.6 m/h, stayed in the moving bed reactor for 6 h, and discharged from the bottom of the moving bed reactor, wherein the moving bed reactor had a diameter of 0.6 m and a height of 1.8 m. All of the pipelines, moving bed reactor and feed port had an inner wall surface made of ceramic coating layer which had a thickness of 0.04 m, thereby avoiding the introduction of impurities during the calcination process. Clean oxygen enrichment gas having an oxygen content of 95% was introduced from the bottom of the moving bed reactor from bottom to top at a velocity of 0.5 cm/s. Introduction of oxygen enrichment oxygen took away waste gases such as water vapor produced in the reaction process. The inner temperature in the moving bed reactor was set as 780° C., finally to give a $LiNi_{0.85}Co_{0.1}Al_{0.05}O_2$ material.

COMPARATIVE EXAMPLE 1

100 kg $Ni_{0.8}Co_{0.1}Mn_{0.1}(OH)_2$ having a mean particle size of 9 μm, and a specific surface area of 8.2 $m^2$/g and 48.5 kg lithium hydroxide monohydrate were accurately weighted, and uniformly mixed. The mixture was put in a saggar, in which the heights of the filler were respectively controlled to be 25 mm, 35 mm, 45 mm, and 55 mm, marked as four batches A, B, C and D respectively. The mixture was pretreated at 280° C. for 5 h, and then precalcined at 500° C. in a tunnel kiln, thermal insulated for 5 h, and then heated to 780° C., thermal insulated for 6 h. In the calcination process, clean oxygen enrichment gas having an oxygen content of 95% was continuously introduced, finally to give a $LiNi_{0.8}Co_{0.1}Mn_{0.1}O_2$ material.

COMPARATIVE EXAMPLE 2

150 kg $Ni_{0.6}Co_{0.2}Mn_{0.2}(OH)_2$ having a specific surface area of 6.2 $m^2$/g and 65.3 kg lithium carbonate were accurately weighted, uniformly mixed, and pretreated at 80° C. for 5 h. The obtained precursor was precalcined at 550° C. in a roller hearth furnace, and thermal insulated for 5 h. In the calcination process, clean air was continuously introduced, to give an intermediate. The other conditions were kept the same as those in Example 2.

COMPARATIVE EXAMPLE 3

All of the pipelines of the moving bed reactor, the moving bed reactor and the feed port had no inner wall surfaces made of ceramic coating material, and the other conditions were kept the same as those in Example 3.

COMPARATIVE EXAMPLE 4

The moving velocity of the material in the moving bed reactor was changed to 0 m/h. The material stayed in the moving bed reactor for 6 h, and discharged from the bottom of the moving bed reactor. The other conditions were kept the same as those in Example 4.

COMPARATIVE EXAMPLE 5

The moving velocity of the material in the moving bed reactor was changed to 40 m/h. The material stayed in the moving bed reactor for 6 h, and discharged from the bottom of the moving bed reactor. The other conditions were kept the same as those in Example 4.

COMPARATIVE EXAMPLE 6

The velocity of the gas was adjusted to 3.5 cm/s, and the other conditions were kept the same as those in Example 4.

The products obtained in the above examples and comparative examples were subjected to performance tests.

XRD Tests and Analysis

Figure 3:
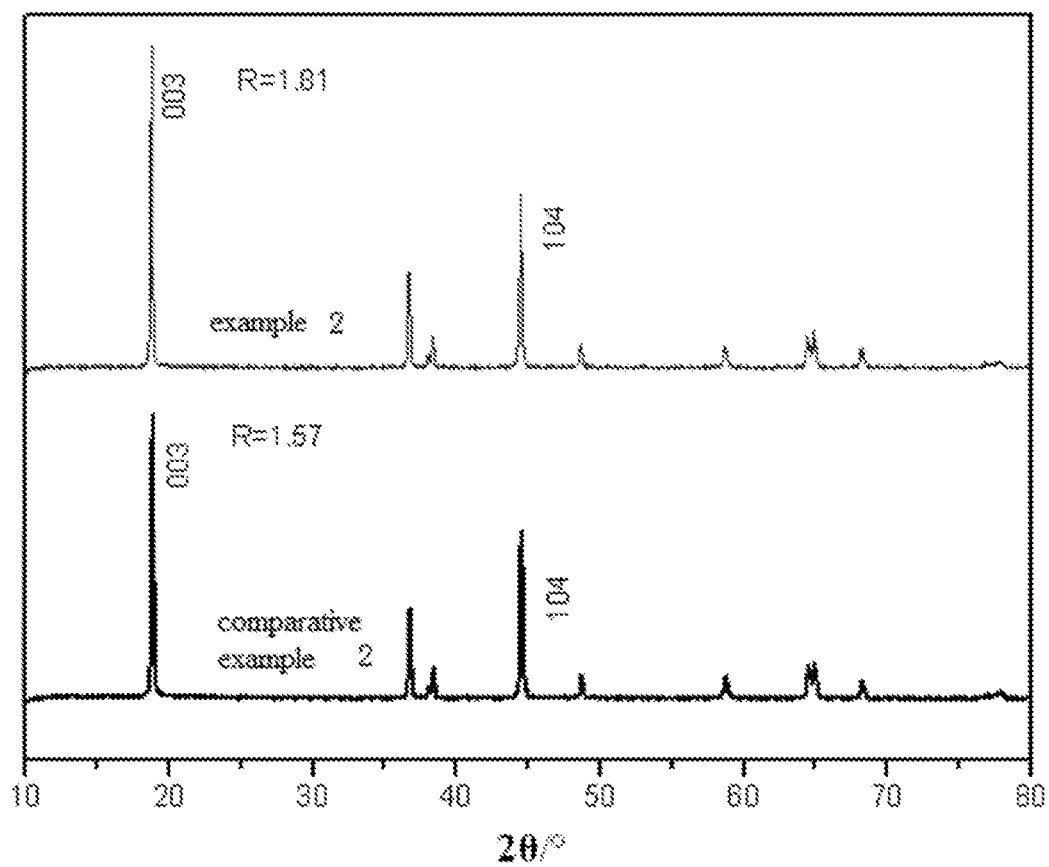
FIG. 3 shows an XRD figure of the products in Example 2 and Comparative Example 2 of the present disclosure.

The XRD analysis was shown in FIG. 3. FIG. 3 showed an XRD figure of the products in Example 2 and Comparative Example 2 of the present disclosure. Generally, the intensity ratio R of (003) peak and (104) peak was used to indicate the mixing degree of cations in the material. The lager R was, the less the mixing degree of the cations in the material was. Generally, when R was larger than 1.2, the cations had a relatively small mixing degree. R of the material prepared in the example was 1.72, lager than 1.2, indicating that the mixing degree of the cations in the material was relatively small.

Electrochemical Performance Analysis

The material was subjected to electrochemical performance analysis. A CR2032 button half-cell was used, and graphite was used as the negative electrode, to test the electrochemical performance of the material at normal temperature (25° C.) and normal voltage (3.0-4.3V). The preparation process of battery material was an oxidation reaction process, such that sufficient contact with the gas during the calcination process was a necessary condition for ensuring the excellent performance of the material. For this reason, the thickness of filler during the calcination process was a key factor that restricted the production efficiency of battery material. Comparison of the electrochemical tests of different batches of material in Example 1 and Comparative example 1 (see FIG. 1) found that this invention solved this problem well and improved the production efficiency. Compared with the conventional process, since the method of the invention can ensure sufficient contact between the gas and the material, the oxygen consumption is largely decreased and the cost is decreased together with ensuring the performance of the material.

TABLE 1

Oxygen consumption and performance analysis of the material prepared in Example 1 and Comparative example 1 of the present disclosure

| Test sample | Comparative example 1 | | | | Example 1 |
|---|---|---|---|---|---|
| | A | B | C | D | |
| Height of the filler/mm | 25 | 35 | 45 | 55 | 1800 |
| specific capacity at 0.2 C (mAh/g) | 200.5 | 198.4 | 194.2 | 191.2 | 201.2 |
| Retention rate after 100 cycles at 1 C/1 C/% | 93.2 | 92.8 | 91.3 | 87.2 | 94.1 |
| $R(I_{003}/I_{104})$ | 1.66 | 1.62 | 1.47 | 1.29 | 1.75 |
| oxygen consumption of material of unit mass (kg/kg) | 8.0 | 5.7 | 4.5 | 3.9 | 1.6 |

Particle Size Distribution Test

Figure 2:
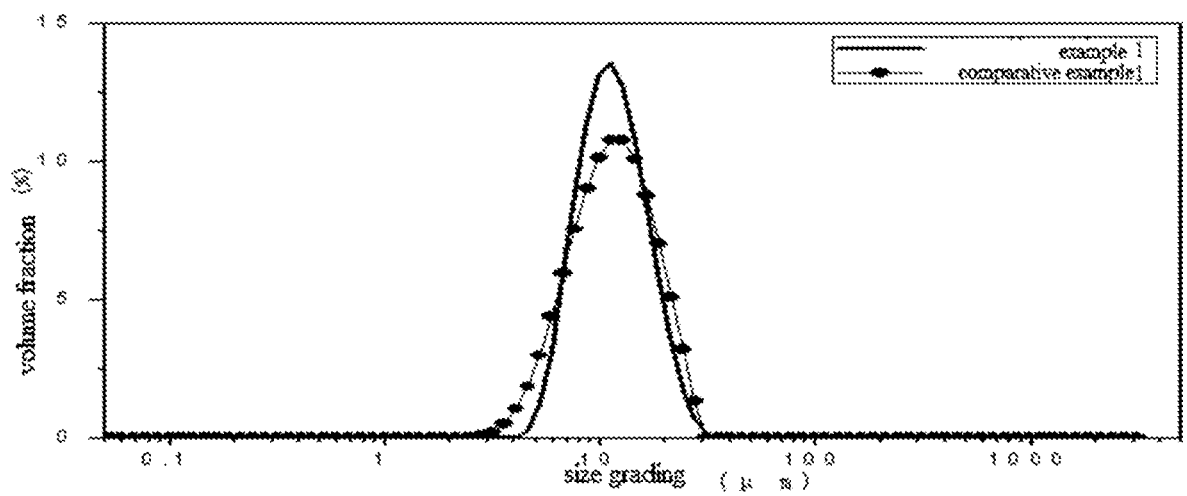
FIG. 2 is a comparison diagram of the particle size distribution of the products in Example 1 and Comparative Example 1 of the present disclosure.

For battery materials, the narrower the particle size distribution was, the more improved the subsequent processability of the material was. The processability also influenced the electrochemical performance of the material. However, due to the preparation technology (strong alkaline corrosion and high temperature), hardening problems easily occurred during the calcination of battery material. In order to avoid this, a pretreatment process was introduced. The results were shown in FIG. 2 and Table 2. FIG. 2 was a particle size distribution comparison diagram of products in Example 1 and Comparative Example 1 of the present disclosure. It can be concluded from FIG. 2 that the particle size distribution of Example 1 which had been subjected to pretreatment was narrower than that in Comparative example 1.

Table 2 showed the particle size distribution analysis of Example 2 and Comparative example 2 in the present disclosure. Example 2 was treated at 280° C. for 5 h, and Comparative example 2 was treated at 80° C. for 5 h. After the treatment, the angle of repose of the precursor in Example 2 was 35°, and the angle of repose of the precursor in Comparative example2 was 56°. As shown in Table 2, the particle size distribution of the material prepared in Example 2 was narrower than that of Comparative example2, and the material had a higher specific capacity, and a better cycle performance. It can be concluded that if the material was directly calcined with a moving bed without pretreatment, the processability and electrochemical performances of the material are seriously influenced.

TABLE 2

Comparative analysis of performances of Example 2 and Comparative example 2 in the present disclosure

| Sample | Angle of repose of the precursor/° | Particle size/μm | | | Span [D90 − D10]/D50 | XRD $R(I_{003}/I_{104})$ | Discharge specific capacity at 0.2 C (mAh/g) | Retentionrate after 100 cycles at 1 C/1 C/% |
|---|---|---|---|---|---|---|---|---|
| | | D10 | D50 | D90 | | | | |
| Example 2 | 35 | 6.2 | 11 | 16.2 | 0.91 | 1.81 | 174.8 | 98.5 |
| Comparative example 2 | 56 | 4.3 | 15.2 | 23.7 | 1.28 | 1.57 | 167.3 | 91.2 |

Analysis of Contents of Impurities and Magnetic Foreign Matter

Figure 4:
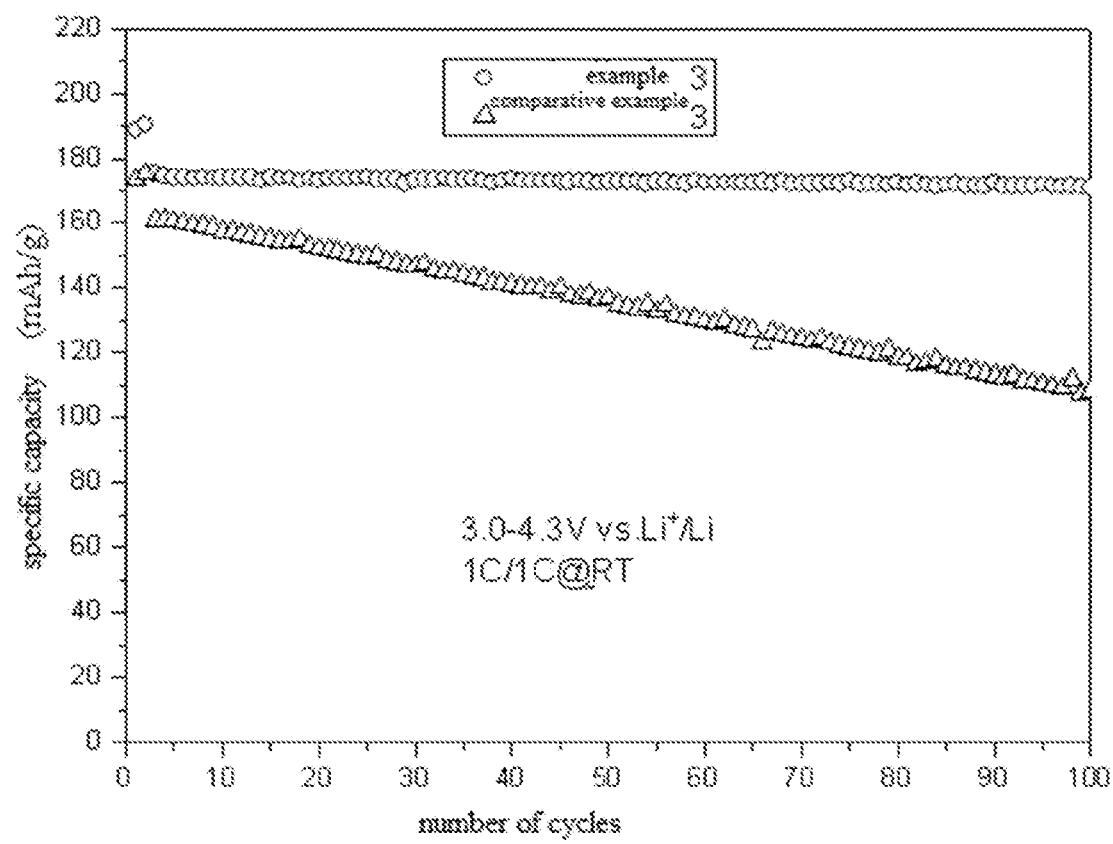
FIG. 4 shows a cycle performance diagram of the products in Example 3 and Comparative Example 3 of the present disclosure.

For battery materials, impurities and magnetic foreign matter directly influenced the performances of the material. Due to strong alkaline substance involved in the material preparation process, routine metal materials were easily corroded and contaminated the material. Therefore, how to avoid the material being contaminated by other metal impurities during the calcination process under high temperature conditions was a difficulty in the preparation of the material. We tested the contents of impurities and magnetic foreign matter (by ICP test) and the electrochemical performances (3.0-4.3V vsLi+/Li@RT) of the materials prepared in Example 3 and Comparative example 3. As shown in Table 3 and FIG. 4, all of the pipelines, moving bed reactor and feed port of the apparatus in Comparative example 3 had no inner wall surfaces made of ceramic coating layers, and the contents of impurities in the prepared material was seriously higher than those in the material prepared in Example 3. The electrochemical performances of the material prepared in Comparative example 3 were worse. The specific capacity decreased by dozens of mAh/g, especially the cycle performance was seriously degraded, and the retention rate after 100 cycles at 1C/1C decreased by more than 30%. In addition, the impurities and magnetic matter in the battery material severely exceeded the limit, which not only influenced the discharge capacity and cycle performance of the material, but also seriously influenced the safety performance of the material, probably leading to short circuit, fire breaking out and even explosion of the battery. Thus, the control requirements for the content of impurities and magnetic matter were extremely strict.

TABLE 3

Comparative analysis of contents of impurities and magnetic foreign matter and the electrochemical performances of the materials prepared in Example 3 and Comparative example 3

| | Fe/ppm | Cu/ppm | Other impurities/ppm | Magnetic foreign matter/ppb | Discharge specific capacity at 0.2 C (mAh/g) | Retention rate after 100 cycles at 1 C/1 C/% |
|---|---|---|---|---|---|---|
| Example 3 | 29 | 17 | 21 | 48 | 175.1 | 98.7 |
| Comparative example 3 | 460 | 21 | 167 | 316 | 161.3 | 63.9 |

TABLE 4

Contrastive analysis of electrochemical performances and XRD of materials prepared in Example 4 and comparative examples 4-6 of the present disclosure

| | Comparative example 4 | Comparative example 5 | Comparative example 6 | Example 4 |
|---|---|---|---|---|
| Velocity of gas (cm/s) | 0.5 | 0.5 | 3.5 | 0.5 |
| Moving velocity (m/h) | 0 | 40 | 0.6 | 0.6 |
| Specific capacity at 0.2 C (mAh/g) | 189 | 191 | 176 | 203.8 |
| Retention rate after 100 cycles at 1 C/1 C/% | 72.3 | 71.5 | 67.3 | 97.6 |
| $R(I_{003}/I_{104})$ | 1.10 | 1.15 | 1.02 | 1.67 |
| [D90 − D10]/D50 | 1.78 | 1.32 | 1.12 | 1.05 |

It can be concluded from the data in Table 4 that when the material moved excessive slow or fast in the moving bed, it would affect the progress of reaction. When the moving velocity was too slow (such as Comparative example 4), it would lead to hardening of the material, and the particle size distribution of the material was relatively broad, influencing the electrochemical performance and processability of the material. When the moving velocity was too fast (such as Comparative example 5), it was difficult to ensure full contact between the material and gas, and difficult to ensure sufficient reaction of the material, influencing the electrochemical performance of the material. In Comparative example 6, the gas velocity was increased, and the particle size distribution of the material was relatively narrow. However, due to the gas velocity was excessively high, which in one aspect accelerated the entrainment and volatilization of lithium source, and influenced the progress of reaction at the same time, leading to extremely bad electrochemical performances of the material.

The above descriptions are only preferred embodiments of the present disclosure. It should be noted that a number of modifications and refinements may be made by one of ordinary skills in the art without departing from the principles of the disclosure, and such modifications and refinements are also considered to be within the scope of protection of the disclosure.

The invention claimed is:

1. A method for preparing a transition metal lithium oxide, comprising steps of A) mixing a lithium salt and a transition metal compound, and performing a pretreatment to obtain a precursor;
    wherein the pretreatment temperature is 100-300° C.; and the pretreatment time is 1-10 h;
    B) precalcining the precursor to obtain an intermediate; and
    C) continuously feeding the intermediate into a feed port of a moving bed reactor, and calcining, to obtain a transition metal lithium oxide.

2. The method according to claim 1, wherein the precalcination temperature is 300-700° C.; and
    the precalcination time is 1-10 h.

3. The method according to claim 1, wherein the precursor has an angle of repose of ≤50°.

4. The method according to claim 1, wherein the moving bed reactor is filled with gas, and the gas is one or more of oxygen, nitrogen or air;
    the gas has a flow velocity of 0.01-10 cm/s.

5. The method according to claim 1, wherein the intermediate moves downward from the feed port at a moving velocity of 0.01-30 m/h.

6. The method according to claim 1, wherein the intermediate falls downward in the moving bed reactor in a direction at an angle of 0-45° with respect to perpendicular.

7. The method according to claim 1, wherein the calcination temperature is 500-1000° C.; and
    the intermediate in the moving bed reactor has a retention time of 5-20 h.

8. The method according to claim 1, wherein after the calcination of step C), the method further comprises the following steps:
    recalcining the calcined product, to obtain a transition metal lithium oxide;
    wherein the recalcination temperature is 500-1000° C.; and
    the recalcination time is 1-10 h.

* * * * *